(12) United States Patent
Busch-Sorensen

(10) Patent No.: US 8,923,921 B2
(45) Date of Patent: Dec. 30, 2014

(54) SIGNAL ENHANCEMENT FOR LOAD MODULATION

(71) Applicant: Cubic Corporation, San Diego, CA (US)

(72) Inventor: Thomas Busch-Sorensen, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/220,591

(22) Filed: Mar. 20, 2014

(65) Prior Publication Data

US 2014/0287691 A1    Sep. 25, 2014

Related U.S. Application Data

(60) Provisional application No. 61/803,740, filed on Mar. 20, 2013.

(51) Int. Cl.
*H04M 1/00* (2006.01)
*G06K 7/10* (2006.01)
*H04B 7/24* (2006.01)

(52) U.S. Cl.
CPC .............. *G06K 7/10217* (2013.01); *H04B 7/24* (2013.01)
USPC ......................... 455/558; 340/10.1; 340/10.2

(58) Field of Classification Search
USPC .......... 455/556.1–558; 340/10.1–10.3, 12.51, 340/13.26
See application file for complete search history.

(56) References Cited

U.S. PATENT DOCUMENTS

| | | | | |
|---|---|---|---|---|
| 6,072,383 A | * | 6/2000 | Gallagher et al. | 340/10.2 |
| 2009/0251288 A1 | * | 10/2009 | Nikitin et al. | 340/10.1 |
| 2010/0219995 A1 | * | 9/2010 | Kim et al. | 341/110 |

* cited by examiner

*Primary Examiner* — Kashif Siddiqui

(74) *Attorney, Agent, or Firm* — Kilpatrick Townsend & Stockton LLP

(57) ABSTRACT

Systems and methods are provided for enhancing a signal for load modulation from reading a smartcard. According to such methods, an antenna signal is generated by transceiver circuitry. An antenna signal field associated with the antenna signal can be transmitted. A reference signal that is substantially constant in amplitude and phase and substantially in phase with a carrier frequency of the antenna signal can be generated. A modulated antenna signal can be received. The modulated antenna signal can include the antenna signal that has been modulated as a result of the presence of a smartcard within the antenna signal field. The reference signal can be subtracted from the modulated antenna signal to produce a resultant signal. The resultant signal may be provided to receiving circuitry of the transceiver circuitry.

20 Claims, 8 Drawing Sheets

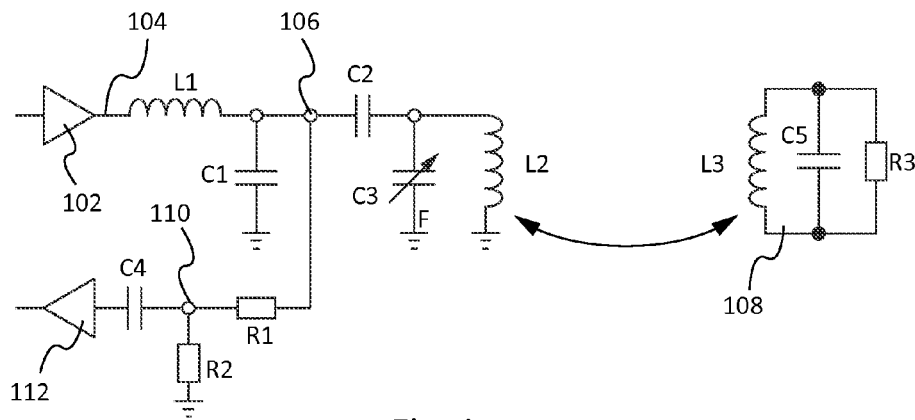
Fig. 1
Smart card at max range                     Smart card at close range
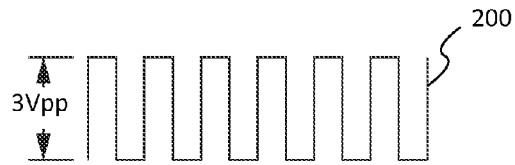
Fig. 2
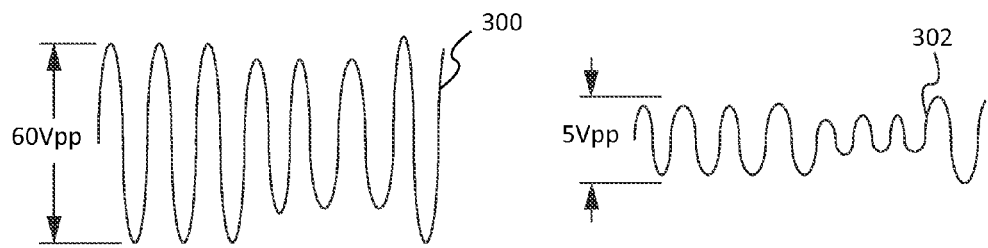
Fig. 3
Load Modulation
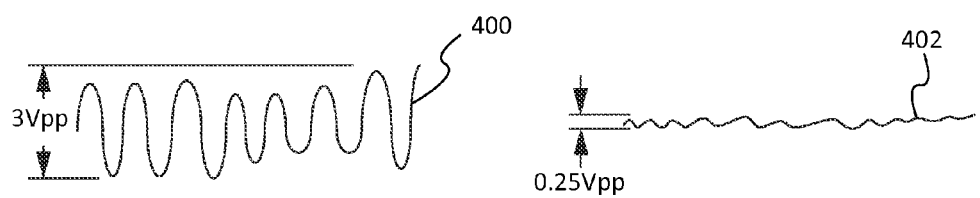
Fig. 4A                                        Fig. 4B

SIGNAL ENHANCEMENT FOR LOAD MODULATION

CROSS-REFERENCES TO RELATED APPLICATIONS

This Application claims priority to U.S. Provisional Patent Application No. 61/803,740 filed Mar. 20, 2013, entitled "SIGNAL ENHANCEMENT FOR LOAD MODULATION," the entire disclosure of which is hereby incorporated by reference, for all purposes, as if fully set forth herein.

BACKGROUND OF THE INVENTION

Contactless smartcards, such as proximity or vicinity cards, communicate with a card reader by load modulation. The reader receives the load modulation signal as (amplitude) AM modulation of the carrier frequency, typically 13.56 MHz. The amplitude of the antenna voltage varies depending on the load that the card present to the reader antenna. At close range, when the coupling factor is high between the smartcard and the antenna, the antenna voltage can be fairly low, typically 5-10 volts peak to peak (Vpp). At far range, where the coupling factor is low, the antenna voltage can be high, up to 60 Vpp.

Typical reader integrated circuits (ICs) often have the antenna signal routed directly to the receiver without any signal processing except attenuation. These receivers are typically limited to a signal level of less than 3 Vpp. Since the antenna voltage can be as high as 60 Vpp, it can be necessary to attenuate the signal by as much as 20×. This reduces the load modulation at close range to the point where the receiver fails to decode the signal. If the load modulation from the card results in a change in amplitude of 1%, then the amplitude at close range could be as low as 50 mV or 2.5 mVpp after 20×attenuation. The typical minimum detectable signal on the most common reader ICs is 5 mVpp. Thus, typical readers can fail to detect the modulation. Typical readers use a simple attenuator to bring the signal below the maximum amplitude or supply voltage of the IC. Some more advanced receiver designs filter out the carrier from the received signal, but this requires very close tolerances on the components. Improvements in reading load modulated signals in card readers are desired.

BRIEF SUMMARY OF THE INVENTION

Embodiments of the present invention reduce the required dynamic range of the receiver by subtracting a reference signal from a modulated antenna signal, thereby reducing the dynamic range of a receiver from approximately 1:5 to approximately 1:2 or less. In some embodiments, the reference signal can be generated simultaneously with the transmitted antenna signal. The reference signal is not exposed to load modulation from a smartcard, allowing the reference signal to remain approximately constant in amplitude and phase. The phase and amplitude of the reference signal can be selected and/or adjusted such that a carrier frequency of the modulated antenna signal is reduced significantly, but the modulation remains unchanged.

Some embodiments take advantage of the fact that the antenna signal has a predictable phase and amplitude relationship to the reference signal. This makes it possible to subtract most or all of the reference signal without reducing the amplitude of the modulation signal. Thus, among other advantages, embodiments of the invention described herein can increase the signal strength of the modulation signal and produce predictable results without requiring close tolerances or tuning of the circuit.

In one aspect, embodiments of the present invention provide a method of enhancing a signal for load modulation from reading a smartcard. The method can include generating, by transceiver circuitry, an antenna signal. The method can also include transmitting an antenna signal field associated with the antenna signal. The method includes generating a reference signal that is substantially constant in amplitude and phase and substantially in phase with a carrier frequency of the antenna signal. The method can further include receiving a modulated antenna signal. The modulated antenna signal can include the antenna signal that has been modulated as a result of the presence of a smartcard within the antenna signal field. The method can also include subtracting the reference signal from the modulated antenna signal to produce a resultant signal. The method also can include providing the resultant signal to receiving circuitry of the transceiver circuitry.

In some embodiments, the reference signal and the transmit signal are generated simultaneously. In other embodiments, subtracting the reference signal from the modulated antenna signal is done using a transformer. The method can further include actively adjusting a phase of the reference signal based on a phase change of the modulated antenna signal resulting from modulation from the smartcard. Other embodiments can include reducing an amplitude of the resultant signal. The method can include adjusting a phase of the reference signal relative to the antenna signal between about 30° and 60°. Subtracting the reference signal from the modulated antenna signal can be done using one or more of resistive elements, capacitive elements, or a differential amplifier. In some embodiments, transmitting the antenna signal field is done by a first antenna and receiving the modulated antenna signal is done by a second antenna.

In another aspect, the present invention provides a smartcard reader for enhancing a load modulated signal. The smartcard reader can include transceiver circuitry configured to generate an antenna signal and to transmit an antenna signal field associated with the antenna signal. The transceiver circuitry can be configured to generate a reference signal that is substantially constant in amplitude and phase and that is substantially in phase with a carrier frequency of the antenna signal. The transceiver circuitry can be further configured to receive a modulated antenna signal. The modulated antenna signal can include the antenna signal that has been modulated due to the presence of a smartcard within the antenna signal field. The transceiver circuitry can also be configured to subtract the reference signal from the modulated antenna signal to produce a resultant signal and to provide the resultant signal to receiving circuitry of the transceiver circuitry.

In some embodiments, the transceiver circuitry is further configured to reduce an amplitude of the resultant signal. The transceiver circuitry can include a transformer that subtracts the reference signal from the modulated antenna signal. In some embodiments, the transceiver circuitry includes a first antenna that generates the antenna signal and a second antenna that receives the modulated antenna signal. In other embodiments, the transceiver circuitry can be further configured to adjust a phase of the reference signal. The transceiver circuitry can be further configured to actively adjust a phase and amplitude of the reference signal based on a phase change of the modulated antenna signal resulting from modulation from the smartcard.

In another aspect, the present invention provides a transceiver for a smartcard reader for enhancing a load modulated signal. The transceiver can include resonating circuitry having inductive and capacitive elements configured to generate a reference signal and an antenna signal. The transceiver can also include antenna circuitry comprising at least one antenna coupled to the resonating circuitry configured to transmit an antenna field associated with the antenna signal and to receive a modulated antenna signal. The modulated antenna signal can include the antenna signal that has been modulated due to the presence of a smartcard within the antenna signal field. The transceiver can further include differential circuitry that is coupled with the antenna circuitry and is configured to subtract the reference signal from the modulated antenna signal to produce a resultant signal.

In some embodiments, the at least one antenna can include a first antenna that transmits the antenna field and a second antenna that receives the modulated antenna signal. In other embodiments the differential circuitry includes one or more of a transformer, a resistive element, or a differential amplifier. The transceiver can further include a transformer configured to reduce an amplitude of the resultant signal. The transceiver can also include one or more of an inductive element or a capacitive element to adjust a phase of the reference signal. In some embodiments, the transceiver can include a phase-lock loop to actively adjust a phase of the reference signal based on a phase change of the modulated antenna signal resulting from modulation from the smartcard.

A further understanding of the nature and advantages of the present invention may be realized by reference to the remaining portions of the specification and the drawings, wherein like reference numerals are used throughout the several drawings to refer to similar components. In some instances, a sublabel is associated with a reference numeral and is delimited by a hyphen to denote one of multiple similar components. When reference is made to a reference numeral without specification to an existing sublabel, it is intended to refer to all such multiple similar components.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein:

FIG. 1 illustrates a typical receiver circuit.

FIG. 2 illustrates a transmitted square wave signal of the receiver circuit of FIG. 1.

FIG. 3 illustrates modulated antenna signals of the receiver circuit of FIG. 1.

FIGS. 4A and 4B illustrate a reduced modulated antenna signal according to embodiments of the invention.

DETAILED DESCRIPTION OF THE INVENTION

Figure 5:
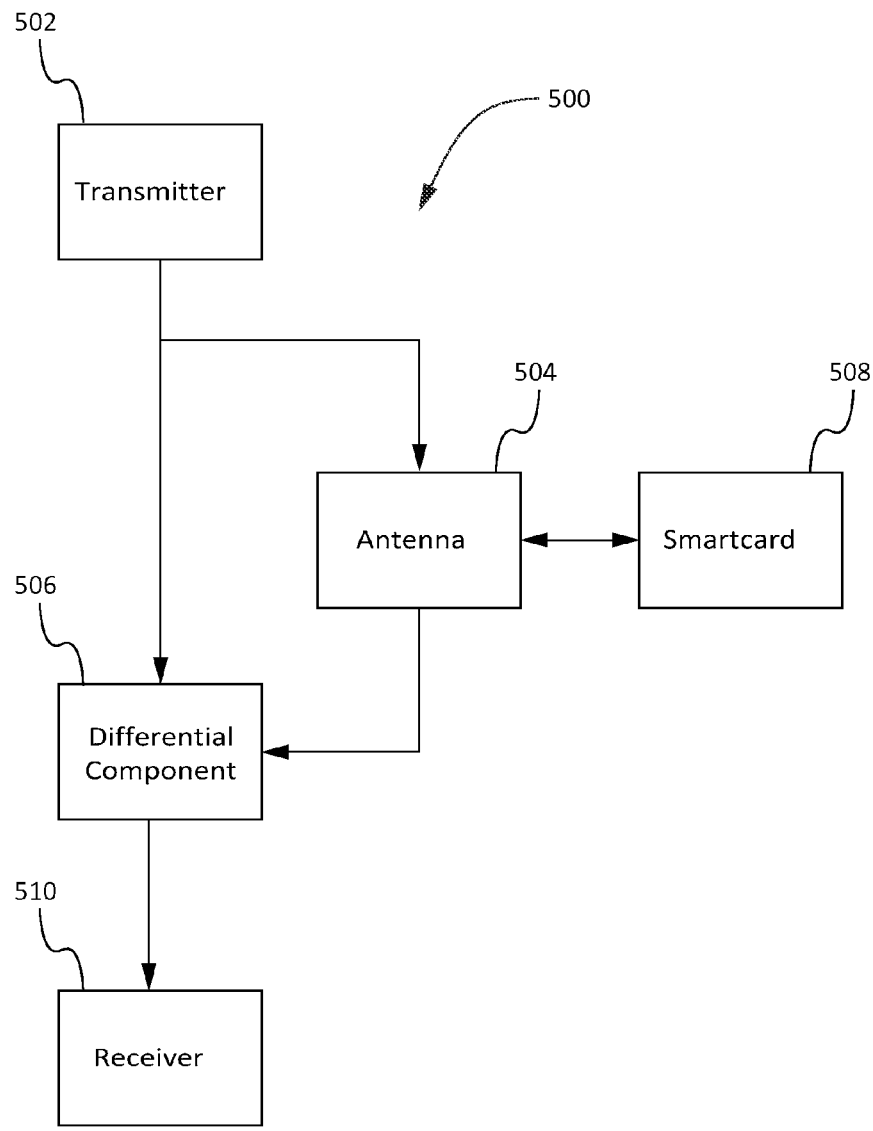
FIG. 5 illustrates a block diagram of a receiver circuit according to embodiments of the invention.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It will be understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments of the present invention generate a reference signal and an antenna signal having a predictable phase and amplitude relationship to the reference signal. The antenna signal can be load modulated when in communication with a smartcard. The reference signal can then be subtracted from the modulated antenna signal to cancel most or all of the reference signal/carrier frequency without reducing the amplitude of the desired modulation signal. This enables a receiver to more easily read the modulation signal, and thus information from the smartcard. Some embodiments of the present invention reduce the required dynamic range of the receiver by subtracting a reference signal from the antenna signal, thereby reducing the dynamic range from approximately 1:5 to approximately 1:2 or less.

FIG. 1 shows a smartcard reader including a circuit 100 that has a transmitter 102. Transmitter 102 sends out a signal to an antenna coil L2 to be modulated by a smartcard 108. For example, transmitter 102 can send out an antenna signal, shown as a square wave 200 in FIG. 2. Square wave 200 can be detected, for example, at node 104 of circuit 100. Square wave 200 can have any voltage amplitude that transmitter 102 is capable of producing, such as 3 Vpp. Square wave 200 can be amplified, phase shifted, converted to a sine wave, or be otherwise adjusted with circuitry. FIG. 1 shows, for example, an inductive element L1 and capacitive element C1 can be included to amplify and convert the square wave having a 3 Vpp amplitude into a sine wave having a 60 Vpp amplitude. In some embodiments, inductive element L1 can have a value of between about 400 nH and 800 nH and capacitive element C1 can have a value between about 100 pF and 400 pF. For example, inductive element L1 may have a value of 560 nH and capacitive element C1 can have a value of 220 pF. Additional circuitry, such as capacitive elements C2 and C3 can be included to adjust the antenna signal and/or a modulated antenna signal. In some embodiments, capacitive elements C2 and C3 can have a capacitance between about 5 pF and 300 pF. For example, capacitive element C2 may have a capacitance of 27 pF and capacitive element C3 can have a capacitance of 150 pF. In some embodiments, capacitive element C3 is a variable capacitive element.

Transmitter 102 can send a signal to antenna coil L2 which produces an antenna field. Antenna coil L2 can have a value below about 10 pH. For example, antenna coil L2 can have a value of 1 pH. Smartcard 108 can include an antenna L3 that can communicate with antenna coil L2, a capacitive element C5, and a resistive element R3. In some embodiments, antenna L3 can have an impedance of less than about 5 µH, capacitive element C5 can have an impedance of between 25 pF and 150 pF, and resistive element R3 can have a resistance between about 1 kΩ and about 20 kΩ. For example, antenna L3 can have an impedance of 2.2 µH, capacitive element C5 can have a capacitance of 75 pF, and resistive element R3 can have a resistance of 10 kΩ. A coupling factor of antenna coil L2 and the smartcard antenna L3 can be between about 5% and 80% based on the proximity of the smartcard antenna L3 to the antenna coil L2. Content within the smartcard then communicates back to the antenna L2 by switching in an out of resistor R3. Smartcard 108 loads the antenna field while modulating. When the signal is not modulating, there is no loading of the antenna signal. The switching of the resistor R3 in and out results in an amplitude change or modulation of the antenna signal at antenna L2.

The modulated antenna signal can be detected at node 106. Examples of modulated antenna signals are shown in FIG. 3. For example, signal 300 is a modulated antenna signal when the smartcard is at a maximum range of the card reader antenna L2. Signal 300 can have a 60 Vpp amplitude. Signal 302 shows an example of a modulated antenna signal that is produced when the smartcard is at close range relative to the antenna L2. Signal 302 can have an amplitude of 5 Vpp.

Referring back to circuit 100 of FIG. 1, a resistor divider that includes resistive elements R1 and R2 and/or one or more capacitive elements C4 can be included to reduce the amplitude of the modulated antenna signal. Resistive elements R1 and R2 and capacitive element C4 can be designed such that the amplitude of the modulated signal at node 110 is never higher than the supply voltage of the chip or a reader 112 to prevent the modulated signal from being clipped and rendering the system inoperable. In some cases, the supply voltage of the chip can be about 3 VDC. The capacitive element C4 can have a value of between about 500 pF and 1500 pF. In one embodiment, the capacitive element C4 has a value of 1000 pF. This reduction of the modulated signal's amplitude results in some voltage ranges (based on the proximity of the smartcard antenna L3 to the antenna L2) having a strong signal, such as the maximum range signal 400 as shown in FIG. 4A. At other voltage ranges, such as when the smartcard 108 is at a closer mid-range to the antenna L2, there is very little modulation. Such a signal 402 shown in FIG. 4B makes it very difficult to pull the small amount of modulation out of the 3 Vpp signal. At node 110, the modulation is about 1-2%. Such small amounts of modulation on top of a 3 Vpp signal can be below the detection level of a conventional IC.

FIG. 5 shows a block diagram of a circuit 500 of a card reader for enhancing a signal for load modulation. The circuit 500 can include a transmitter circuitry portion 502 that can include resonating circuitry that generates a reference signal to a differential circuitry portion 506 along with transmitting an antenna signal to an antenna circuitry portion 504 of the circuit 500. In some embodiments, the reference signal can be transmitted simultaneously with the antenna signal. The reference signal can be substantially constant in amplitude and phase and can be substantially in phase with a carrier frequency of the antenna signal. In one embodiment, the carrier frequency can be 13.56 MHz. In some embodiments, one or both of the reference signal and antenna signals is phase shifted, amplified, converted to a sine wave, or otherwise adjusted. In some embodiments, the transmitter circuitry portion 502 can be a circuit such as the circuitry shown in blocks 614 and 614e of FIGS. 6A-6E and the antenna circuitry portion 504 can be a circuit such as the circuitry shown in blocks 616, 616b, and 616c of FIGS. 6A-6E. However, it will be appreciated that other circuitry and components may be used for transmitter circuitry portion 502 and antenna circuitry portion 504. The antenna circuitry portion 504 can include at least one antenna that transmits an antenna field associated with the antenna signal. The transmitted antenna signal can then be load modulated from a smartcard 508 that is in proximity with the antenna field. The antenna circuitry portion 504 can receive the modulated antenna signal and transmit the modulated antenna signal to a differential circuitry portion 506.

In some embodiments, the differential circuitry portion 506 can be a circuit such as the circuitry shown in blocks 618, 618d, and 618e of FIGS. 6A-6E. The differential circuitry portion 506 can subtract the reference signal from the modulated antenna signal to produce a resultant signal. The resultant signal can then be provided to a receiving circuitry portion 510 of the circuit 500. In some embodiments, the receiving circuitry portion 510 can be a circuit such as the circuitry shown in block 620 of FIGS. 6A-6E.

In addition, the differential circuitry portion 506 can amplify or reduce the signal, depending on the voltage range of the receiving circuitry portion 510. For example, a transformer can be configured to reduce the amplitude of the resultant signal. Additional circuitry may be included within circuit 500 to adjust a phase of the reference signal to correlate to a measured phase of the modulated antenna signal or to adjust the phase of the reference signal to an expected phase of the modulated antenna signal. In some embodiments, a phase-lock loop can be included to shift the phase of the reference signal based on a measured phase of the modulated antenna signal. This ensures that the entire carrier frequency of the modulated antenna signal can be canceled out as the reference signal is subtracted from the modulated antenna signal, producing a stronger resultant signal.

FIGS. 6A-6E illustrate circuits having sections that correspond to the circuitry portions 502, 504, 506, and 510 of FIG. 5. It will be appreciated that the circuits of FIGS. 6A-6E can have similar characteristics as the circuit represented by circuit 500. In addition, circuitry represented by circuit 500 may have similar characteristics as described in the circuits of FIGS. 6A-6E. With the circuit 600a shown in FIG. 6A, transceiver circuitry 614 can send a reference signal to differential circuitry 618 and antenna circuitry 616. For example, transceiver circuitry 614 can include a transmitter 602 that generates a stable reference signal along with an antenna signal. In some embodiments, the reference signal can be generated as a square wave, such as square wave 200 from FIG. 2. Square wave 200 can have any voltage amplitude that transmitter 602 is capable of producing, such as 3 Vpp. The reference signal can be detected at node 604 and sent to a transformer T1. Square wave 200 can be amplified, phase shifted, converted to a sine wave, or be otherwise manipulated with circuitry before and/or after node 604.

Figure 6A:
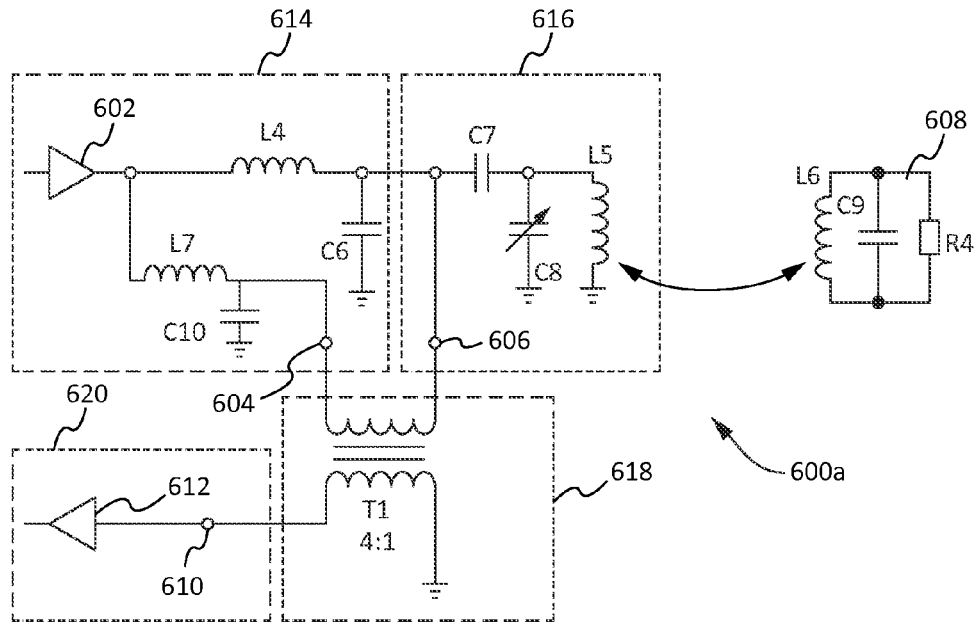
FIGS. 6A-6E depict receiver circuits for smartcard readers according to embodiments of the invention.
Figure 6B:
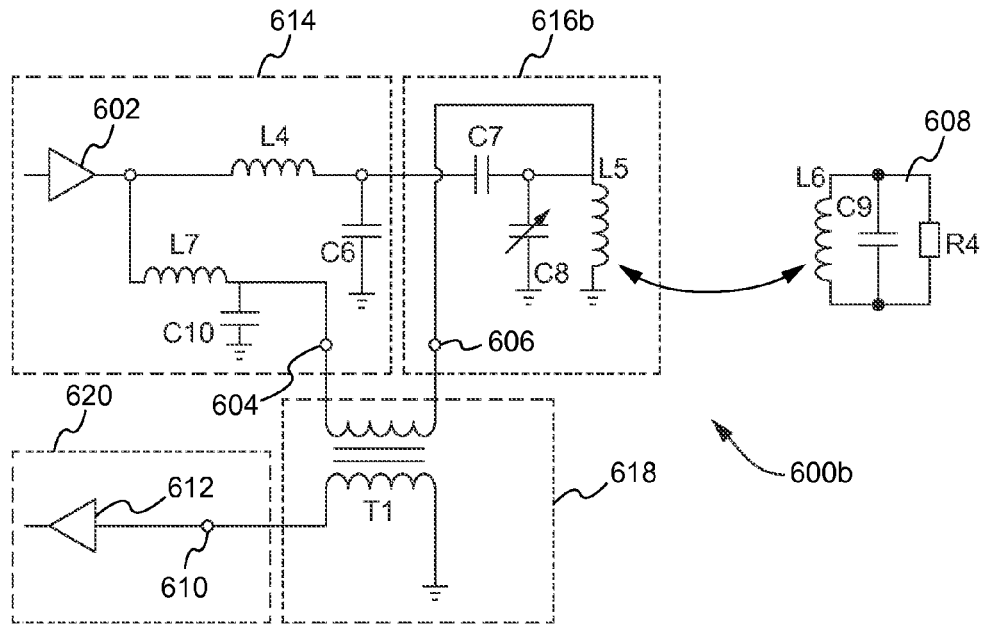
Figure 6C:
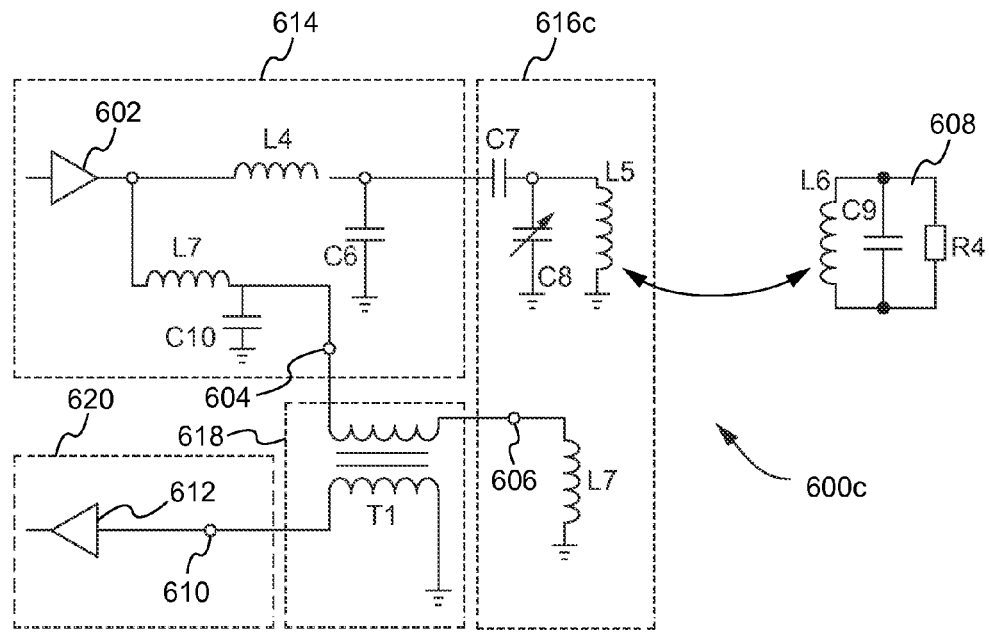
Figure 7:
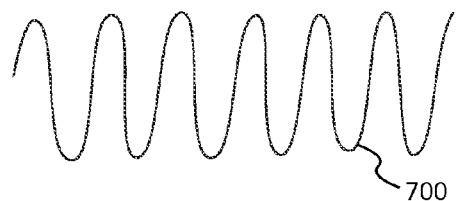
FIG. 7 illustrates a reference signal according to embodiments of the invention.

FIG. 6A shows, for example, inductive elements L4 and L7 and capacitive elements C6 and C10 can be included to amplify and convert the generated square wave reference and antenna signals having 3 Vpp amplitudes into sine wave signals having 60 Vpp amplitudes. FIG. 7 shows a sinusoidal reference signal 700 having an amplitude of about 60 Vpp, although reference signal 700 may have any desired amplitude and phase. The reference signal 700 can be substantially the same as the unmodulated antenna signal, having the same amplitude and phase as the antenna signal. As such, it is known what signal is being transmitted to the antenna coil L5. In some embodiments, inductive elements L4 and L7 can have an inductance of between about 0.25 µH and 1 µH and capacitive elements C6 and C10 can have a capacitance between about 100 pF and 300 pF. For example, inductive elements L4 and L7 may have an inductance of 0.47 µH and capacitive elements C6 and C10 can have a capacitance of 180 pF or 270 pF. In some embodiments, the impedance and capacitance are selected based on a frequency of the chip. In some embodiments, such as the chip 1002 of FIG. 10, a resonance of the circuitry should be in the range of about 12.7 MHz and about 14.4 MHz. This includes an operating frequency of about 13.56 MHz and a modulation frequency of about 0.84 MHz. In some embodiments, inductive elements L4 and L7 can have the same inductance. In other embodiments, inductive elements L4 and L7 can have different inductance from each other. In some embodiments, capacitive elements C6 and C10 can have the same inductance. In other embodiments, inductive elements C6 and C10 can have different capacitance from each other. The antenna signal is transmitted to an antenna coil L5.

Additional circuitry, such as capacitive elements C7 and C8 can be included to adjust the antenna signal and/or a modulated antenna signal. In some embodiments, capacitive element C8 is a variable capacitive element. Transmitter 602 can send a signal to antenna coil L5 which produces an antenna field.

Figure 8A:
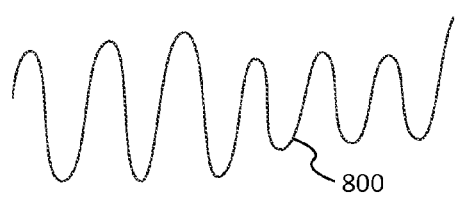
FIGS. 8A and 8B illustrate a modulated antenna signal according to embodiments of the invention.
Figure 8B:
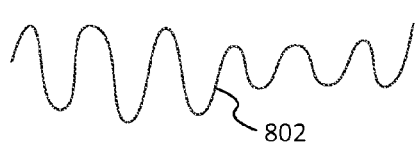

A smartcard 608 can include an antenna L6 that can communicate with antenna coil L5, a capacitive element C9, and a resistive element R4. A coupling factor of antenna coil L5 and the smartcard antenna L6 can be between about 5% and 80% based on the proximity of the smartcard antenna L6 to the antenna coil L5. Content within the smartcard 608 then communicates back to the antenna L5 by switching resistor R4 in an out. Smartcard 608 loads the antenna field while modulating. When the signal is not modulating, there is no loading of the antenna signal. The switching of the resistor R4 in and out results in an amplitude change or modulation of the transmitted antenna signal at antenna L5. The modulated antenna signal can be detected at node 606. Examples of modulated antenna signals are shown in FIGS. 8A and 8B. For example, signal 800 in FIG. 8A is a modulated antenna signal when the smartcard 608 is at a maximum of the card reader antenna L5. Signal 800 has a 60 Vpp amplitude. Signal 802 in FIG. 8B shows an example of a modulated antenna signal that is produced when the smartcard is at close range to the antenna L5. Signal 802 can have an amplitude of 5 Vpp. As noted above with regard to inductive element L4 and L7 and capacitive elements C6 and C10, the values of the inductive elements L5 and L6, capacitive elements C7-C9, and resistive element R4 may be selected to maintain a signal within a desired frequency range of about 12.7 MHz and about 14.4 MHz.

The closer the smartcard 608 gets to the reader antenna coil L5, the more the smartcard 608 attenuates the field. This creates a dynamic range that could vary from about 1 to 12 in signal strength. As the smartcard 608 is at a maximum range, or far from the antenna L5, the amplitude of the antenna signal can be large, in some cases about 60 Vpp. When the signal is a maximum amplitude, the smallest percentage of modulation occurs. For example, at a maximum range, a smartcard 608 may modulate the signal by about 1% to about 2% or less. At closer range, the modulation may be between about 10% or about 15% or more. At maximum range a 60 Vpp signal may have a 200 mV modulation. At closer range, a 5 Vpp signal may also have a 200 mV modulation.

The smartcard reader further includes differential circuitry 618 to subtract the reference signal from the modulated antenna signal to produce a resultant signal. In some embodiments, transformer T1 is used to perform the subtraction of the reference signal. Transformer T1 can isolate the modulation from the stronger carrier frequency of the modulated antenna signal. In alternative embodiments where the transmitter T1 transmits the reference signal in an opposite phase from the modulated antenna signal, then the modulated antenna signal and the reference signal could be summed with a network of resistive elements to produce the resultant signal.

The resultant signal can be detected at node 610 and allows the modulation to be more easily detected. The resultant modulation signal is much stronger relative to any remaining portions of the reference signal and a carrier frequency of the modulated antenna signal. The resultant modulation signal has reduced amplitude due to the subtraction of reference signal. The modulation may be in the range of about 20% under ideal conditions, although in some cases the improved modulation will be in the range of 2-2.5 times the modulation seen in the circuit of FIG. 1, or about 5%. Modulation of this magnitude can be adequately detected by receiving circuitry 620 having a receiver 612. In some embodiments, the resultant signal is strengthened and the required dynamic range of receiver 612 is reduced. The resultant signal can then be delivered to receiver 612.

Figure 9A:
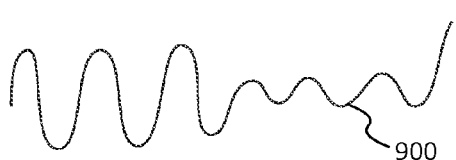
FIGS. 9A and 9B illustrate a resultant signal according to embodiments of the invention.
Figure 9B:
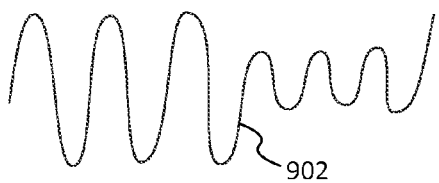

FIG. 9A shows a resultant signal 900 when the smartcard 608 is at a maximum range. FIG. 9B shows a resultant signal 902 when the smartcard 608 is at a close range. These resultant signals 900 and 902 have much larger modulation than signals 400 and 402 of FIGS. 4A and 4B from circuits without differential circuitry.

Oftentimes, the modulated antenna signal has changed phase due to the load from the smartcard 608. For example, the phase of the antenna signal can be shifted in the range from between 0 and 90 degrees upon modulation by the smartcard 608. The phase changes and range of possible phase changes attributable to the modulation can vary depending on the smartcard 608 used. In such cases, the reference signal and the modulated antenna signal have different phases and do not cancel out fully upon the subtraction of the reference signal. To account for the card load-induced phase shift, the circuitry can passively shift the phase of the reference signal an amount within the range of phase shifts the antenna signal may see due to the load from smartcard 608. This maximizes the cancellation of the reference signal. In some embodiments, inductive and capacitive element pairs such as L4 and C5, and L7 and C9 can be adjusted to produce a sine wave having the same or substantially the same phase for both the reference signal and the antenna signal. In other embodiments, the inductive and resistive element pair L4 and C5 can be adjusted differently than inductive and capacitive element pair L7 and C9 to produce a sine wave having a phase within an expected phase range of the modulated antenna signal.

In some embodiments, the phase of the reference signal can be shifted to the middle of the range of the anticipated antenna signal phase shift. For example, the phase of the reference signal can be adjusted relative to the antenna signal between about 30° and 60°. In some cases, the phase of the reference signal can be shifted about 45° to maximize the cancellation upon the subtraction of the reference signal. This allows the signal strength of the modulated signal to be increased, as the larger reference signal/carrier frequency is no longer present. In some cases, the relative signal strength of the modulated signal can be increased by 3 or 4 times. In some embodiments, the transformer T1 can act as a differential input to the receiver 612 to account for a phase shift. Thus, the transformer T1 can amplify the difference between the two signals without amplifying the particular voltages. Other embodiments can include circuitry to actively adjust a phase of the reference signal based on a phase change of the modulated antenna signal resulting from modulation from the smart card, for example using a phase-lock loop.

In some embodiments, there is a limit to how much voltage can be delivered to receiver 612. Once the voltage limit or supply voltage of the receiver is reached, the signal is clipped. To prevent this, some embodiments include circuitry that reduces the amplitude of the resultant signal. In some embodiments, this reduction in amplitude can be done by transformer T1. In cases where smartcard 608 is far away from the antenna L5, the modulation from that smartcard 608 can be quite small, sometimes on the order of 0.1% or less. This small modulation is often sitting on top of a fairly large signal, for example 60 Vpp. Thus, when the signal is reduced in voltage below the supply voltage of the chip, the modulation can fall below the detection level of the chip.

Due to the presence of a voltage divider, a stronger modulation on top of a smaller signal may be undetectable. For example, a signal having an amplitude in the range of about 5 Vpp will not have much modulated signal to detect after a reduction in amplitude. For example, a divider may be used that reduces the signal 20× to drop a 60 Vpp signal to a 3 Vpp signal that can be handled by the receiver 612. Such a divider will reduce a 5 Vpp signal to 0.25 Vpp. Oftentimes, the minimum detection level of a receiver is around 5 mVpp. Modulation on a 0.25 Vpp signal may be too small to be detectable. Even a relatively strong amount of modulation may not be detectable from a signal this small.

FIGS. 6B-6E show examples of modifications to the circuit of FIG. 6A. For example, FIG. 2B shows a circuit 600b that includes the circuit 600a of FIG. 2A having different antenna circuitry 616b. Antenna circuitry 616b can include a direct path from the antenna coil L5 to transformer T1. In this circuit, the modulated antenna signal can be detected directly from the antenna coil L5. FIG. 2C shows a circuit 600c that includes the circuit 600a of FIG. 6A different antenna circuitry 616c. Antenna circuitry 616c can include a second antenna coil L7 coupled to the transformer T1 and configured to receive the modulated antenna signal. A first antenna L5 transmits the generated antenna signal, creating an antenna field. As smartcard 608 is brought in proximity to the antenna field, the smartcard 608 loads the antenna signal, which is picked up as the modulated antenna signal at node 606 from the second antenna coil L7.

Figure 6D:
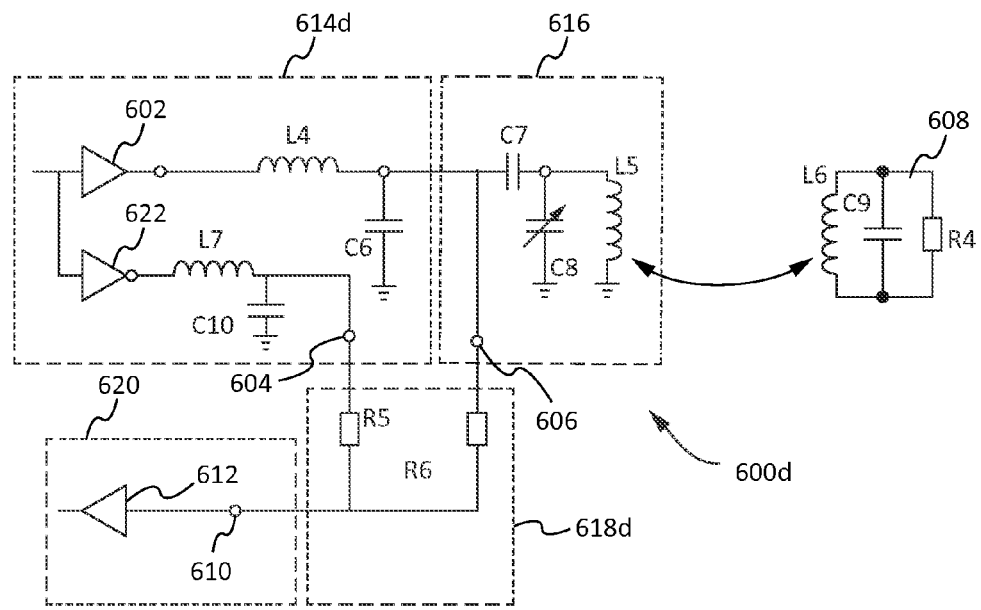
Figure 6E:
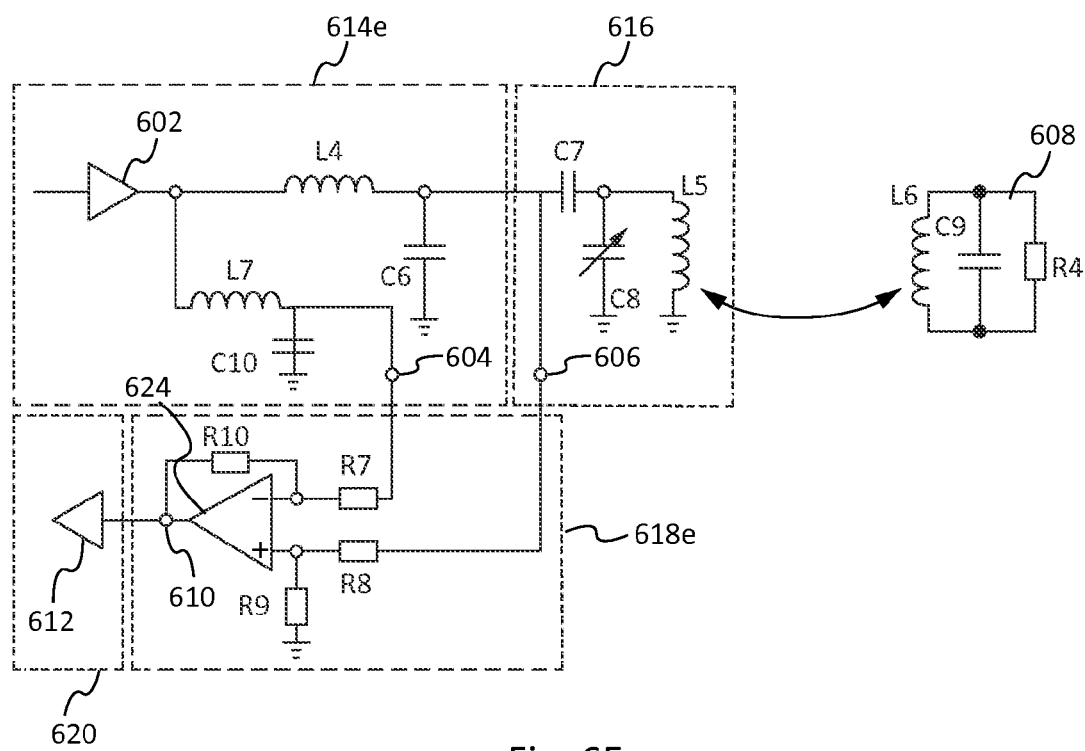

FIG. 6D shows a circuit 600d that includes the circuit 600a of FIG. 6A having a different transmitter circuitry portion 614d and differential circuitry portion 618d. Transmitter circuitry portion 614d can include an inverter 622 coupled with circuitry that generates the reference signal. The reference signal is a square wave with the phase reversed, compared to the transmitted signal. Differential circuitry portion 618d can include a resistive circuit in place of a transformer to add the inverted reference signal to the modulated antenna signal. For example, resistive elements R5 and R6 can be configured to subtract the reference signal from the modulated antenna signal in place of the transformer T1 of differential circuitry portion 618 of FIG. 6A. FIG. 6E shows a circuit 600e that includes the circuit 600a of FIG. 6A having a differential circuitry 618e. Differential circuitry portion 618e includes an operational amplifier 624 rather than transformer T1 of circuit 600a to subtract the reference signal from the modulated antenna signal. In some embodiments, resistive elements can be included with the operational amplifier 624. Resistive elements R7, R8, R9, and R10 in combination with operational amplifier 624 form a differential amplifier.

Figure 10:
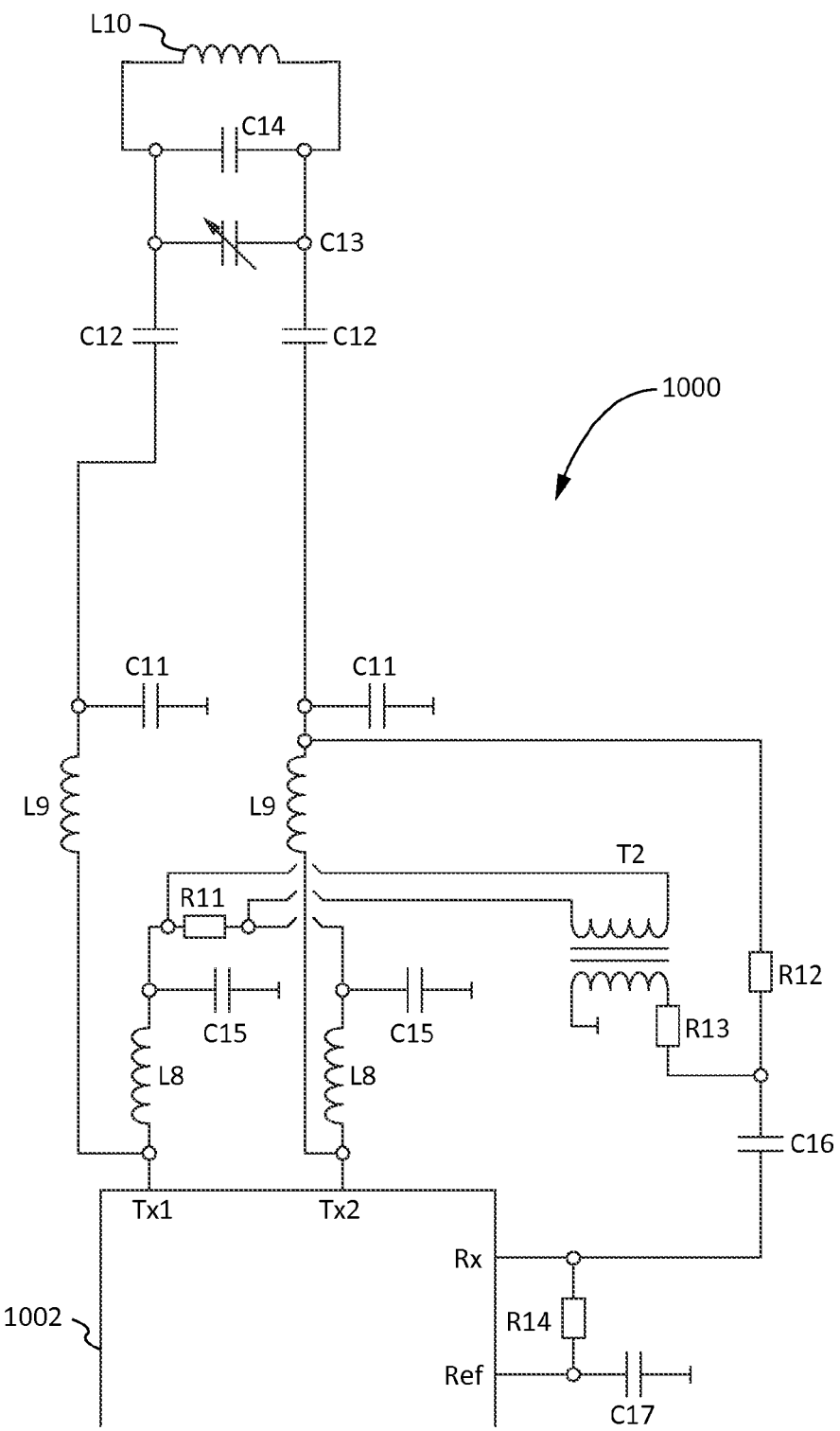
FIG. 10 illustrates a front end circuit according to some embodiments of the invention.

Referring now to FIG. 10, one embodiment of a smartcard reader circuit 1000 is shown. It will be appreciated that characteristics of circuits 500, 600a-600e, and 1000 can be interchangeable, and any combination of the various components and embodiments may be used. An integrated circuit chip 1002 can be coupled with circuit 1000 to enhance a signal for load modulation. Chip 1002 can be a transceiver IC chip, for example a NXP PN512 as shown here. The NXP chip 1002 contains two transmitters TX1 and TX2 that operate 180 degrees out of phase. By using both transmitters, a balanced circuit is attained. Each transmitter TX1 and TX2 can be coupled with circuitry such as inductive elements L9 and capacitive elements C11 to generate an antenna signal having a sine wave. In some embodiments, inductive elements L9 can have an impedance between about 100 nH and about 1000 nH and capacitive elements C11 can have a capacitance between about 100 and 500 pF. For example, inductive elements L9 can have an impedance of 560 nH and capacitive elements C11 can have a capacitance of 220 pF. The antenna signal can be transmitted to an antenna L10. Antenna L10 can communicate with a smartcard, such as smartcard 608 described in FIG. 6A. The smartcard can receive a command in the form of the antenna signal. The smartcard can load the antenna signal using capacitive elements and/or by switching a resistive element in and out. The antenna L10 can receive the modulated antenna signal and can be coupled with circuitry that can adjust the antenna signal and/or the modulated antenna signal. For example, the circuitry can include capacitive elements C12, C13, and C14. In some embodiments, capacitive elements C12, C13, and C14 can have values between about 5 pF and about 200 pF. For example, capacitive element C12 may have a capacitance of about 27 pF, capacitive element C13 may have a capacitance of about 20 pF, and capacitive element C14 can have a capacitance of about 100 pF. In some embodiments, capacitive element C13 can be a variable capacitive element.

Each transmitter TX1 and TX2 can also generate a reference signal to transmit to a transformer T2. Circuitry, such as capacitive elements C15 and inductive elements L8 can be included to amplify, convert, or otherwise modify the generated reference signal. In some embodiments, inductive element L8 can have an impedance between about 1 µH and about 10 µH and capacitive element C15 can have a capacitance between about 5 and about 50 pF. For example, inductive element L8 can have an impedance of about 5.6 µH and capacitive element C15 can have a capacitance of about 2.2 pF. The antenna signal can be transmitted to an antenna L10. For example, generated reference signal may be converted from a 3 Vpp square wave to a 60 Vpp sine wave. The reference signal can also pass through a low pass filter. For example, a low pass filter can include a resistive element R11.

The modulated antenna signal can be passed through a low pass filter and to the transformer T2. The modulated antenna signal low pass filter can include resistive elements R12 and R13, although other low pass filters may be used. In some embodiments, resistive elements R12 and R13 can have a resistance of between about 1 kΩ and about 5 kΩ. For example, resistive elements R12 and R13 can have a resistance of about 2.2 kΩ. Transformer T2 can subtract the reference signal from the modulated antenna signal to produce a resultant signal. The resultant signal may then be provided to a receiver RX. Circuitry can be included to reduce the amplitude or otherwise modify the resultant signal. For example, capacitive elements C16 and C17 can be included along with resistive element R14 to reduce the amplitude of the resultant signal to ensure the amplitude of the resultant signal is below a supply voltage or voltage limit of the receiver RX of chip 1002. In some embodiments, capacitive element C16 can have a capacitance less than about 5 nF, capacitive element C17 can have a capacitance below about 500 nF, and resistive element R14 can have a resistance above about 500Ω. For example, capacitive element C16 can have a capacitance of about 1 nF, capacitive element C17 can have a capacitance of about 100 nF, and resistive element R14 can have a resistance of about 1 kΩ.

In some embodiments, the voltage limit of the receiver RX is not well defined. For example, the voltage limit may be 2.8 Vpp, 3.0 Vpp, and/or −1 V to AVDD+1 V. If the voltage limit is −1 V to AVDD+1 V, then another 10% of headroom may be achieved by changing the supply voltage(s) to 3.6 V (which may entail changing all analog supply voltages).

Embodiments improve the signal strength of the modulated antenna signal by subtracting the reference signal generated by the transmitter output. The signal on the output of the low pass filter formed by inductive element L9 and capacitive element C11 can vary from 100% amplitude (app. 18 Vpp) to 60% depending on how close the smartcard is to the antenna L10. The transmitters TX1 and TX2 on the PN512 chip 1002 are substantially constant, so the reference signal be sent through similar low pass filters (but with higher impedance) formed by inductive element L8 and capacitive element C15 and loaded with resistive element R11 to generate a final reference signal that is used at the input of transformer T2. The inverted reference signal is added to the antenna signal in a ratio controlled by the ratio between resistive elements R12 and R13. Capacitive element C16 blocks any DC component in the signal that is biased to a reference voltage REF on the receiver chip 1002 through R14.

Figure 11:
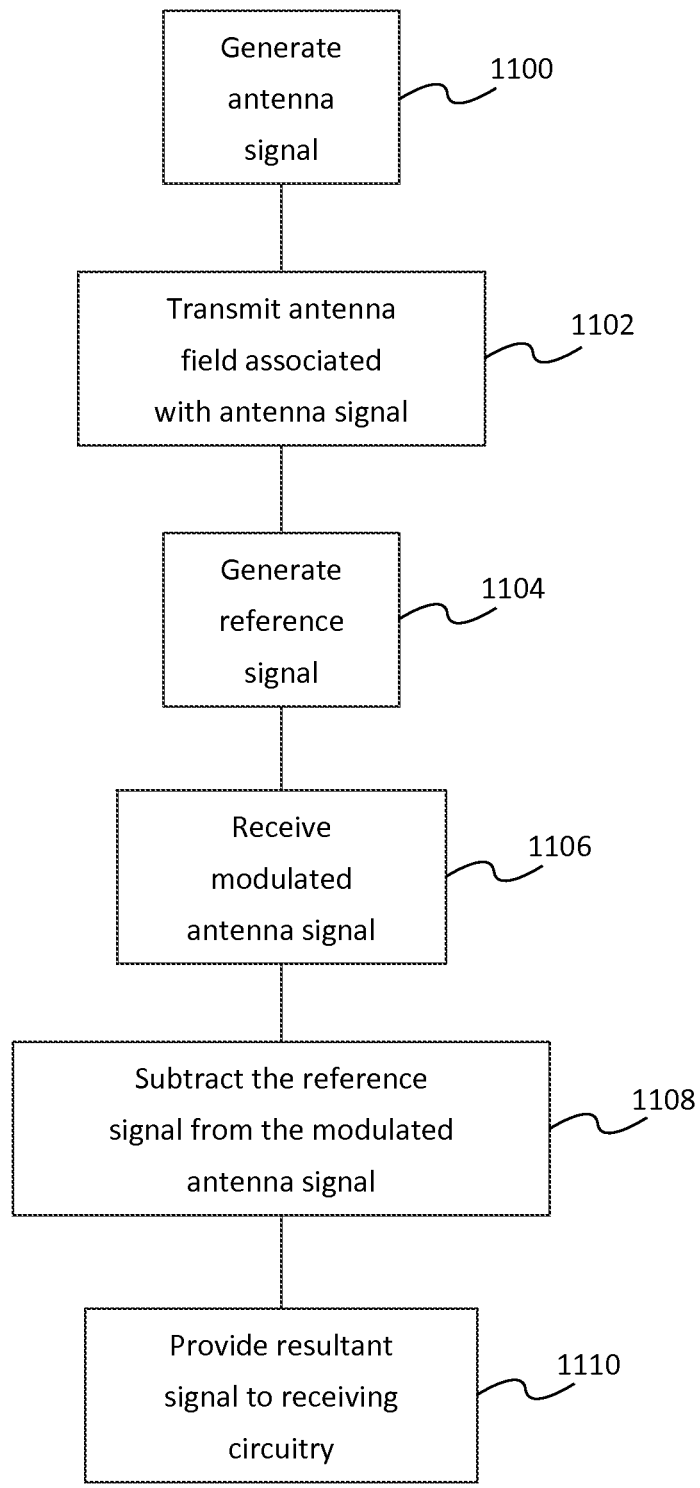
FIG. 11 illustrates a flow chart of a method of enhancing a signal for load modulation according to some embodiments of the invention.

FIG. 11 shows a flowchart of a method of enhancing a signal for load modulation from reading a smartcard. At block 1100, an antenna signal can be generated by transceiver circuitry. An antenna signal field associated with the antenna signal can be transmitted at block 1102. A reference signal can be generated at block 1104. The reference signal may be substantially constant in amplitude and phase and can be substantially in phase with a carrier frequency of the antenna signal. In some embodiments, the reference signal and the antenna signal may be generated simultaneously. At block 1106, a modulated antenna signal can be received. The modulated antenna signal can include the antenna signal that has been modulated as a result of the presence of a smartcard within the antenna signal field. In one embodiment, transmitting the antenna signal field is done by a first antenna and receiving the modulated antenna signal is done by a second antenna. In some embodiments, the method further includes actively adjusting a phase of the reference signal based on a phase change of the modulated antenna signal resulting from modulation from the smart card. In other embodiments, the method includes adjusting a phase of the reference signal relative to the antenna signal between about 30° and 60°. At block 1108, the reference signal can be subtracted from the modulated antenna signal to produce a resultant signal. In some embodiments, this subtraction of the reference signal is done using a transformer. In other embodiments, subtracting the reference signal from the modulated antenna signal is done using one or more of resistive elements, capacitive elements, or a differential amplifier. The amplitude of the resultant signal may be reduced. The resultant signal may be provided to receiving circuitry of the transceiver circuitry at block 1110.

While the principles of the disclosure have been described above in connection with specific apparatuses and methods, it is to be clearly understood that this description is made only by way of example and not as limitation on the scope of the disclosure.

What is claimed is:

1. A method of enhancing a signal for load modulation from reading a smartcard, the method comprising:
generating, by transceiver circuitry, an antenna signal;
transmitting an antenna signal field associated with the antenna signal;
generating a reference signal that is substantially constant in amplitude and phase, and substantially in phase with a carrier frequency of the antenna signal;
receiving a modulated antenna signal, wherein the modulated antenna signal comprises the antenna signal that has been modulated as a result of the presence of a smartcard within the antenna signal field;
subtracting the reference signal from the modulated antenna signal to produce a resultant signal; and
providing the resultant signal to receiving circuitry of the transceiver circuitry.

2. The method of enhancing a signal for load modulation from reading a smartcard according to claim 1, wherein the reference signal and the antenna signal are generated simultaneously.

3. The method of enhancing a signal for load modulation from reading a smartcard according to claim 1, wherein subtracting the reference signal from the modulated antenna signal is done using a transformer.

4. The method of enhancing a signal for load modulation from reading a smartcard according to claim 1, further comprising actively adjusting a phase of the reference signal based on a phase change of the modulated antenna signal resulting from modulation from the smartcard.

5. The method of enhancing a signal for load modulation from reading a smartcard according to claim 1, further comprising reducing an amplitude of the resultant signal.

6. The method of enhancing a signal for load modulation from reading a smartcard according to claim 1, further comprising adjusting a phase of the reference signal relative to the antenna signal between about 30° and 60°.

7. The method of enhancing a signal for load modulation from reading a smartcard according to claim 1, wherein subtracting the reference signal from the modulated antenna signal is done using one or more of resistive elements, capacitive elements, or a differential amplifier.

8. The method of enhancing a signal for load modulation from reading a smartcard according to claim 1, wherein transmitting the antenna signal field is done by a first antenna and receiving the modulated antenna signal is done by a second antenna.

9. A smartcard reader for enhancing a load modulated signal, the smartcard reader comprising transceiver circuitry configured to:
generate an antenna signal;
transmit an antenna signal field associated with the antenna signal;
generate a reference signal that is substantially constant in amplitude and phase and that is substantially in phase with a carrier frequency of the antenna signal;
receive a modulated antenna signal, wherein the modulated antenna signal comprises the antenna signal that has been modulated due to the presence of a smartcard within the antenna signal field;

subtract the reference signal from the modulated antenna signal to produce a resultant signal; and provide the resultant signal to receiving circuitry of the transceiver circuitry.

10. The smartcard reader for enhancing a load modulated signal according to claim 9, wherein the transceiver circuitry is further configured to reduce an amplitude of the resultant signal.

11. The smartcard reader for enhancing a load modulated signal according to claim 9, wherein the transceiver circuitry comprises a transformer that subtracts the reference signal from the modulated antenna signal.

12. The smartcard reader for enhancing a load modulated signal according to claim 9, wherein the transceiver circuitry comprises a first antenna that generates the antenna signal and a second antenna that receives the modulated antenna signal.

13. The smartcard reader for enhancing a load modulated signal according to claim 9, wherein the transceiver circuitry is further configured to adjust a phase of the reference signal.

14. The smartcard reader for enhancing a load modulated signal according to claim 9, wherein the transceiver circuitry is further configured to actively adjust a phase and amplitude of the reference signal based on a phase change of the modulated antenna signal resulting from modulation from the smartcard.

15. A transceiver for a smartcard reader for enhancing a load modulated signal, the transceiver comprising:

resonating circuitry comprising inductive and capacitive elements configured to generate a reference signal and an antenna signal, wherein the reference signal is substantially constant in amplitude and phase, and wherein the reference signal is substantially in phase with a carrier frequency of the antenna signal;

antenna circuitry comprising at least one antenna coupled to the resonating circuitry configured to:
transmit an antenna field associated with the antenna signal and receive a modulated antenna signal, wherein the modulated antenna signal comprises the antenna signal that has been modulated due to the presence of a smartcard within the antenna signal field; and differential circuitry that is coupled with the antenna circuitry and is configured to subtract the reference signal from the modulated antenna signal to produce a resultant signal.

16. The transceiver for a smartcard reader for enhancing a load modulated signal according to claim 15, wherein the at least one antenna comprises a first antenna that transmits the antenna field and a second antenna that receives the modulated antenna signal.

17. The transceiver for a smartcard reader for enhancing a load modulated signal according to claim 15, wherein the differential circuitry comprises one or more of a transformer, a resistive element, or a differential amplifier.

18. The transceiver for a smartcard reader for enhancing a load modulated signal according to claim 15, further comprising a transformer configured to reduce an amplitude of the resultant signal.

19. The transceiver for a smartcard reader for enhancing a load modulated signal according to claim 15, further comprising one or more of an inductive element or a capacitive element to adjust a phase of the reference signal.

20. The smartcard reader for enhancing a load modulated signal according to claim 15, further comprising a phase-lock loop to actively adjust a phase of the reference signal based on a phase change of the modulated antenna signal resulting from modulation from the smartcard.

* * * * *